United States Patent Office 3,594,351
Patented July 20, 1971

3,594,351
PROCESS FOR PRODUCING A BLOCK COPOLYMER OF α-AMINO ACID-N-CARBOXY ANHYDRIDE AND AN ISOCYANATE AND A PROCESS FOR PRODUCING SYNTHETIC LEATHER BY THE USE THEREOF
Shinzi Uchida and Yasuo Sone, Hitachi-shi, Japan, assignors to Hitachi Chemical Company, Ltd., Tokyo, Japan
No Drawing. Filed Mar. 26, 1968, Ser. No. 715,952
Claims priority, application Japan, Apr. 10, 1967, 42/22,419, 42/22,422
Int. Cl. C08g 22/04
U.S. Cl. 260—77.5                                    10 Claims

ABSTRACT OF THE DISCLOSURE (1) A process for producing a synthetic resin (C) and a process for producing a synthetic leather by use of said synthetic resin (C), wherein the synthetic resin (C) is produced by the process which comprises:

(I) Reacting an amine having at least two active hydrogen atoms with a urethane pre-polymer having isocyanate groups at the terminals thereof in an equivalent less than an equivalent of the amine to produce a compound (A) having amino groups at the terminals thereof;

(II) Reacting compound (A) with an anhydride of N-carboxy-alpha-amino acid to produce compound (B), a compound having amino groups at the terminals thereof; and (III) Reacting compound (B) with additional urethane pre-polymer, said urethane pre-polymer having isocyanate groups at the terminals thereof, to produce synthetic resin (C).

(2) A process for producing a synthetic resin (C') and a process for producing a synthetic leather by use of said synthetic resin (C'), wherein the synthetic resin (C') is produced by the process which comprises:

(I) Reacting an amine having at least two active hydrogen atoms with an anhydride of N-carboxyl-alpha-amino acid to produce a compound (A') having amino groups at the terminals thereof; and (II) Reacting compound (A') with a urethane pre-polymer, said urethane pre-polymer having isocyanate groups at the terminals thereof to produce synthetic resin (C').

BACKGROUND OF THE INVENTION

(1) A scope of the present invention

The present invention relates to the process for producing a synthetic resin and an artificial leather.

The present invention relates to the process for producing a copolymer of the urethane pre-polymer and the polyamino acid pre-polymer by improving characteristics of the polyamino acid resin to obtain a lower crystallizable and higher molecular substance than the existing one, by forming crosslinkage which does not cause a flow between molecules at a time of their expansion to give a dyeing hygroscopicity, and which produces entropical elastic characteristics as well as an adhesive property based on a chemical structure. The present invention also relates to the process for producing artificial (synthetic) leather which very much resembles natural leather in appearance, feeling and the like and has a surface layer of excellent physical properties and equal chemical resistance which is comparable with the existing artificial leathers.

(2) A clarification for preceding techniques

A polyamino acid can be obtained by polymerizing in a special manner an amino acid such as glutamic acid, aspartic acid and the like contained as a composite component in an albumin. When said polyamino acid is applied to fibers or artificial leathers, they resemble the natural substances in the points of the feeling color and physical and chemical characteristics. However they are not preferable due to an insufficiency in elasticity, adhesive property, dyeing hygroscopicity and the like.

A polyamino acid resin is obtained by synthesizing the α-amino acid N-carboxy anhydride from the amino acid and then by polymerizing said anhydride in a solvent such as dioxane, tetrahydrofuran, dimethylformamide, ethylether, alkyl halides or the like by use of an initiator such as amines, sodium alcoholate, sodium hydroxide, alcohol having an active hydrogen, water and the like.

An artificial leather is obtained by coating directly a polyurethane, polyamide, polyvinyl chloride, cellulose ester and the like on a basing material such as a woven cloth, non-woven cloth or the like, or by applying an under-treatment such as an impregnation or coating of a synthetic resin on the aforesaid basing material followed by a further coating of a synthetic resin as a finishing material thereon and molding the product so as to produce a pattern like a natural leather. And in the latter process, if the polyamide resin is used as the finishing material, a product which very much resembles natural leather in appearance, feeling and the like, can be obtained.

The present invention provides a process for producing artificial leather which more resembles natural leather than the artificial leather obtained by the existing processes, and more specifically relates to a process for producing an artificial leather by using as a finishing material a polyamino acid resin which is a copolymer of a urethane pre-polymer and a polyamino acid pre-polymer obtained by introducing the urethane pre-polymer into the main chain of polyamino acid molecule.

The polyamino acid is obtained by polymerizing in a special manner the amino acid, for instance glutamic acid, aspartic acid, alanine and the like, contained as a component in an albumin, which is a component of a natural leather, and has physical and chemical properties which extremely resembled an albumin. In case where the polyamino acid is used as the surface finishing material for the artificial leather, the product resembles a natural leather more than those using any of the existing finishing materials. However a polyamino acid itself does not possess the desired elasticity, adhesive property and coloring property with pigment, and furthermore is unsatisfactory as an under-treating material and surface finishing material due to drawbacks such as a desquamation of the finishing material, the occurrence of cracks, ununiformity of coloring and the like.

The present invention provides a process for producing artificial leather having improved elasticity, adhesive property and coloring property without losing the characteristics of the existing polyamino acid such as a desirable appearance, feeling, and the like while maintaining the chemical and physical properties in the polyamino acid itself within a requiring range.

SUMMARY OF THE INVENTION

The present invention relates to a process for producing a synthetic resin (C) which comprises reacting an amine with a urethane pre-polymer having terminal isocyanate groups in an amount smaller than the equivalent of the amine to form a urethane pre-polymer having terminal amino groups (A), reacting the pre-polymer (A) with N-carboxy-α-amino acid anhydride to form a compound having terminal amino groups (B) and then reacting the compound (B) with a urethane pre-polymer having terminal isocyanate groups. The present invention also relates to a process for producing an artificial leather by use of said synthetic resin (C).

The present invention is an application of a polymerization mechanism in case where the amine is used as an initiator. The amine used in the present invention is shown as the following formulas;

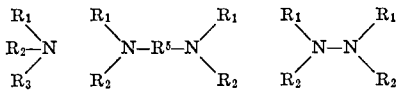

Wherein, $R_1$, $R_2$, and $R_3$ represent a hydrogen or a hydrocarbon group having a number of carbons of 1 to 12 and have at least two active hydrogens or groups having active hydrogen, and $R_5$ represents a chain or cyclic methylene group having a number of carbons of 2 to 10, a benzene or complex benzene ring.

For instance, mono-alkylamine such as methylamine, ethylamine, propylamine, butylamine, hexylamine, octylamine, cyclohexylamine and the like; mono-unsaturated amine such as phenylamine, toluylamine, naphthylamine and the like; alcoholamine such as methanolamine, ethanolamine, and the like; alkylene diamine such as ethylene diamine, trimethylene diamine, piperazine, hydrazine and the like; and the like are used.

The urethane pre-polymer having the isocyanate groups at terminals thereof used in the present invention is obtained by reacting a polyalkylene ether glycol, polyester-diol or a mixture of either one of the foregoing substances and a polyhydric alcohol such as trimethylolpropane, pentaerythritol and the like with a molar excess of a diisocyanate.

Further, said urethane pre-polymer is also obtained by reacting a polymer having a hydroxide group at terminals thereof obtained by reacting an excessive mole of polyalkylene ether glycol, polyester diol or a mixture of either one of the foregoing substances and polyhydric alcohol such as trimethylolpropane, pentaerythritol and the like with the diisocyanate, with further diisocyanate.

A molecular weight of said pre-polymer is preferable to be 10,000 or less if possible.

As the polyalkylene ether glycol, a polymethylene glycol and the like or a mixture thereof are used, and as the polyester diol, a substance obtained by a reaction between a polymethylene glycol such as polyethylene glycol, polypropylene glycol, poly tetramethylene glycol and the like and a di-basic acid such as adipic acid, sebacic acid, succinic acid and the like are used, and a molecular weight thereof is preferable to be 200 to 2500.

As the diisocyanate, an aromaic diisocyanate, aliphatic diisocyanate, alicyclic diisocyanate or a mixture thereof is used.

For instance, toluene-2,4-diisocyanate, diphenyl methane diisocyanate, methaphenylene diisocyanate, methaxylene diisocyanate 4-chloro-1,3-phenylene diisocyanate, 1,6-hexamethylene diisocyanate, 1,10-decamethylene diisocyanate, 1,4-cyclohexylene diisocyanate, 4,4'-methylene-bis (cyclohexyl isocyanate), 1,5-tetrahydronaphthylene diisocyanate and the like are enumerated. An alkylene diisocyanate in which each one of two isocyanates binds directly to an aromatic nucleus is suitable.

As the α-amino acid N-carboxy anhydride used in the present invention, there are employed anhydrides of neutral amino acids having 2 to 12 carbon atoms, such as glycine, alanine, leucine, isoleucine, valine, α-amino heptanoic acid and the like; anhydrides of monoesterified acid amino acids, such as β-benzyl aspartic acid, γ-methyl glutamic acid, γ-benzyl-L-glutamic acid and the like; anhydrides of α,ω-diamino carboxylic acid derivatives wherein the ω-amino group is protected by a suitable masking group, such as ε-acyllysin, δ-acylornithine and the like; and anhydrides of α-amino acid derivatives, such as o-methyl serine, o-acetyl serine, o-acetyl threonine and the like.

As a solvent used in a reaction according to the present invention, such an individuality of a mixture of one kind or more is preferable as chlorinated hydrocarbon such as methylene dichloride, ethylene dichloride, chloroform, carbon tetrachloride and the like; ether such as dioxane, tetrahydrofuran, diethylether, dimethoxy-ethane, diethylene glycol, dimethylether, dihydropyran, tetrahydropyran and the like; and dimethyl formamide, dimethyl acetamide and the like.

The main reactions in the present invention are deemed to proceed as follows;

(I) The reaction between the amine and urethane pre-polymer having isocyanate groups at terminals thereof:

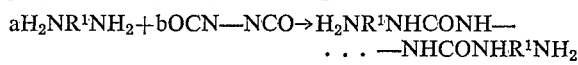

(wherein, $a > b$).

(II) The reaction between the product in (I) and the N-carboxy-α-amino acid anhydride:

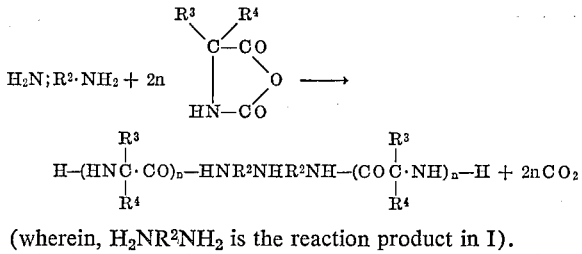

(wherein, $H_2NR^2NH_2$ is the reaction product in I).

(III) The reaction between the product in (II) and the urethane pre-polymer:

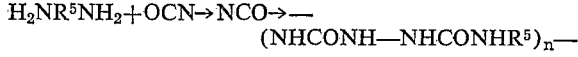

(wherein, $H_2NR^5NH_2$ is the reaction product in II).

Further, in the reactions of (I) and (II), a burette reaction (crosslinking reaction) as;

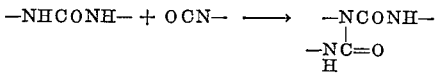

is accompanied.

In the process of the present invention, by varying kinds of urethane pre-polymer, molecular weight thereof, kinds of α-amino acid N-carboxy anhydride, kinds of amine, degrees of polymerization at the time of forming segments, i.e. a ratio between α-amino acid N-carboxy anhydride and urethane pre-polymer determined by $P_n = A/I$ (A: the number of moles of N-carboxy-α-amino acid anhydrides and I: the number of moles of amine) and a ratio $NH_2/NCO$, products which have various physical and chemical properties as well as various feelings in touch can be steadily produced, and resins obtained are suitable for uses as film or fiber. In case where a surface finishing material and an under-treating material prepared by adding a pigment to the resin obtained is used for an artificial leather, the artificial leather thus obtained has an appearance and a feeling which very much resembles natural leather and also has good adhesive property, abrasion-proof property, wrinkle-proof property, scratch-proof property, medicine-proof property, solvent-proof property and colouring property with pigment.

The present invention will be explained hereinafter with reference to experimental examples and working examples.

(A) SYNTHESIS OF POLYMETHYL GLUTAMIC ACID RESIN 10 g. of γ-methyl-L-glutamate-N-carboxy anhydride were put in a Kolben which was equipped with a cooling tube containing a tube filled with calcium chloride and a stirrer, and 50 ml. of dioxane were added thereto to be dissolved. Then 190 ml. of ethylene dichloride and 1/100 part (on basis of an amount of γ-methyl-L-glutamate N-carboxyanhydride) of triethylamine as an initiator of polymerization were added thereto and stirred rapidly at a room temperature. Meanwhile, a liquid became viscous suddenly and a reaction proceeded generating violently a carbonic acid gas. The completion of polymerization could be known by means of quantitative analysis of an amount of remaining α-amino acid N-carboxy anhydride with sodium methylate by use of thymol blue as an indicator. The polymerization was completed for about 5 hours. The polymerized liquid was milky white viscous liquid and the viscosity of one in which the concentration of polymer was 4 percent was 95 poises (25° C.).

The one obtained was formed to a film having about 0.1 mm. in thickness.

(B) POLYMERIZATION OF β-METHYL-DL-ASPARTATE-N-CARBOXY ANHYDRIDE

By use of the same device as in case of (A) 10 g. of β-methyl-DL-aspartate-N-carboxy anhydride were dissolved in 400 ml. chloroform and 1 ml. of hexane solution of aluminum triethyl (0.005 mole/ml.) were added thereto, and the polymerization was carried out at 35° C. for 24 hours. In consequence, the polymerization product of $\eta_{red}$ 2.1 was obtained (this refers to reduced viscosity of a 0.5% solution in dichloroacetic acid at 30° C.).

(C) SYNTHESIS OF URETHANE PRE-POLYMER

Experimental Example 1

In a frasco with 4 mouths of 1-l. volume which was equipped with a cooling tube having stirrer, thermometer, gas supplying tube and tube filled with calcium chloride, 320 parts of polyethylene glycol (average molecular weight: 600) were put being supplied with dried nitrogen gas, and were heated to 70° C. When 176 parts of diphenylmethane diisocyanate having a temperature of 70° C. molten in advance were added thereto and stirring was continued for a while, the temperature of the contents in frasco became 98° C. and meantime began to decrease, but the same was maintained at 90° C. by heating. After reaction of about 4 hours, viscous urethane pre-polymer having isocyanate groups at terminals thereof could be obtained. The final viscosity was 190 poises (90° C.) and an equivalent of isocyanate by means of quantitative analysis of terminated groups was $6.67 \times 10^{-3}$/g.

Experimental Example 2

By use of the same device as in case of the Experimental Example 1, 117 parts of polytetramethylene glycol (average molecular weight: 825) were heated to 70° C., and 54 parts of diphenylmethane diisocyanate molten in advance were added thereto. And in accordance with the same synthesis as in case of the Experimental Example 1, urethane pre-polymer of 131 poises (90° C.) in the final viscosity was obtained.

Experimental Example 3

By use of the same device as in case of the Experimental Example 1, 195 parts of polyethylene glycol (average molecular weight: 550) were heated to 70° C., and 97 parts of toluene-2,4-diisocyanate heated in advance were added thereto. Synthesizing the above in accordance with the same process in case of the Experimental Example 1, urethane pre-polymer of 21 poise (at 90° C.) in the final viscosity was obtained.

Experimental Example 4

By use of the same device as in case of the Experimental Example 1, 895 parts of polyethylene glycol (average molecular weight: 600) were heated to 70° C., and 375 parts of meta-xylene diisocyanate were added thereto. And the synthesis was carried out in the same manner as in case of the Experimental Example 1, and urethane pre-polymer having the final viscosity of 65 poises (at 90° C.) was obtained.

Example 1.—In a frasco with 4 mouths which was equipped with a cooling tube having stirrer, thermometer and tube filled with calcium chloride, 350 parts of methylene dichloride were put and were heated to 35° C. Then 0.557 part of ethylene diamine were added thereto. And 139 parts (an amount of urethane pre-polymer: 13.9 parts) of 10 percent solution which was prepared as that 27.9 parts of urethane pre-polymer synthesized in the Experimental Example 1 mentioned above were dissolved in methylene dichloride were added thereto by means of drip funnel. After 15 minutes from the completion of said drip, the temperature in the reactor was raised to about 30° C. When 265 parts of 20 percent solution which was prepared by dissolving 52.1 parts of γ-methyl-L-glutamate-N-carboxy anhydride in a mixed solvent of methylene dichloride and dimethylformamide (dimethylformamide/methylene dichloride=1/3) were added thereto, carbon dioxide was generated violently and a liquid suddenly became viscous. After the continuation of reaction for about 3 hours, the viscosity became to 3.75 poises at 30° C., and the generation of carbonic acid gas stopped and the increase of viscosity stopped.

When the temperature was raised up to 35° C. and 140 parts of 10 percent solution of urethane pre-polymer (an amount of urethane prepolymer: 14 parts) were gradually added thereto with stirring, the product having the final viscosity of 32 poises at 30° C. could be obtained.

By use of this resin (a), a film was formed.

The polymethyl glutamic acid resin (b) synthesized in the aforesaid (A) and a blend (c) obtained by blending 27.9 parts of urethane pre-polymer synthesized in the foregoing (C), Experimental Example 1 with the solution of polymethyl glutamic acid synthesized in the above-mentioned (A) (an amount corresponding to 52.1 g. of γ-methyl-L-glutamate-N-carboxy anhydride at the time of polymerization of polymer solution) were formed to film respectively. These films were measured by tensile tester being drawn down hysteresis curves, and the results of coefficient of restitution were shown hereunder being compared with the result measured for the resin (A).

| Specimen | Coefficient of restitution at the time of restitution (percent) after— | |
|---|---|---|
| | 20 percent elongation | 50 percent elongation |
| (a) | 95.8 | 84.5 |
| (b) | 38.5 | 18.0 |
| (c) | 35.0 | 16.1 |

(Wherein, the elongation and restitution speeds are 10 mm./minute.)

In the resin (a) synthesized in the Example 1, the restitution of elasticity is shown as notably good.

Further, when the resin synthesized in accordance with the Example 1 was used as a surface finishing material or an under-treating material for an artificial leather, such a product could be obtained which had an appearance and feeling in touch thereof resembled much to those of a natural leather and had an excellent properties physical and equal chemical resistance thereof were excellent being compared with those of the existing artificial leathers.

The specimens (a), (b) and (c) were coated on the surface layer of the three samples of artificial leather, respectively, and then the wrinkle-proof property of the products thus obtained was tested by Scott tester (load: 2 kg.). As the result, any of changes in the specimen (a) was not found in an appearance thereof against wrinkles of 7000 times or more, while in the test of wrinkles of 500 to 600 times for the specimen (b) and in the test of wrinkles of around 1000 times for the specimen (c), the surface layer was disquamated due to an inferior adhesive power and cracks were made due to a short of elasticity of film.

Further, the test for solvent-proof property was made, result of which was shown hereunder, wherein the test was so performed as that; the specimens were coated on the surface layer of samples of the artificial leather, and a solvent was dropped thereon, and after 2 minutes, the solvent was moved up and a change on the surface was observed.

| Kind of solvent | Specimen | State of surface |
| --- | --- | --- |
| Toluene | (a) | Not changed. |
|  | (b) | Do. |
|  | (c) | Affected. |
| Petroleum ether | (a) | Not changed. |
|  | (b) | Do. |
|  | (c) | Do. |
| Acetone | (a) | Do. |
|  | (b) | Do. |
|  | (c) | Affected. |
| Methanol | (a) | Slightly affected. |
|  | (b) | Do. |
|  | (c) | Do. |

The test for adhesive power was carried out and the result thereof was shown hereinafter. Wherein the test was so performed as that; (a) and (b) were formed to sheets respectively, and the respective sheet was adhered on an urethane resin layer by use of the respective resin solution, and after removing the solvent from the adhered layer by drying, the disquamation test was carried out. The size of specimen was 10 mm. in width and 10 cm. in length.

Specimen _____ Load required for disquamation, kg.
(a) ------------------------------------ 3.5
(b) ------------------------------------ 0.7

Moduli of elasticity are as follows:
(a) $6.90 \times 10^2$ kg./cm.$^2$
(b) $6.94 \times 10^4$ kg./cm.$^2$
natural leather $10^2 \sim 10^3$ kg./cm.$^2$ (for reference) (a) is closer to natural leather than (b), so far as modulus of elasticity is concerned.

Example 2.—By use of the same device as in case of the Example 1, 150 parts of a mixed solvent of ethylene dichloride and dioxane (ethylene dichloride/dioxane=7/8) were put in a reaction flask, and the contents were heated to 80° C. After adding 0.2 part of ethylene diamine thereto, 50 parts (urethane pre-polymer: 5 g.) of 10 percent solution which was prepared by dissolving 10 parts of urethane pre-polymer synthesized in the above-mentioned C, the Experimental Example 1 in ethylene dichloride were added thereto. After 15 minutes from the addition, the temperature of the contents was raised up to 30° C., and a solution prepared by dissolving 18 parts of γ-methyl-L-glutamate-N-carboxy anhydride-γ-methylester-N-carboxylic acid in 80 parts of a mixed solvent of ethylene dichloride and dioxane (ethylene dichloride/dioxane=16/49) were added thereto. When the reaction was continued for about 90 minutes, a viscosity became to 1.2 poise and the increase of viscosity stopped. When the temperature of this solution was again raised up to 80° C. and 50 parts (urethane prepolymer: 5 parts) of remaining solution of urethane prepolymer were gradually added thereto, the product having the final viscosity of 10 poise (30° C.) could be obtained.

This product was formed to film and the coefficient of restitution was measured in the same manner as in case of the Example 1.

Coefficient of restitution, percent
Restitution after 20 percent elongation _____ 96.7
Restitution after 50 percent elongation _____ 85.2

Example 3.—By use of the same device as in case of the Example 1, 300 parts of methylene chloride were put in a reaction flask and were heated to 35° C. And 0.9 part of ethylene diamine was added thereto, and further 230 parts (urethane pre-polymer: 23 parts) of 10 percent solution prepared by dissolving 45 parts of urethane pre-polymer synthesized in the above-mentioned C, the Experimental Example 1 in methylene dichloride were added thereto. After 15 minutes from the addition, the temperature of the contents was raised to 30° C. and 175 parts of 20 percent solution prepared by dissolving 35 parts of γ-methyl-L-glutamate-N-carboxy anhydride - γ - methylester-N-carboxylic acid in a mixed solvent of methylene dichloride and dimethylformamide (dimethylformamide/methylene dichloride=7/18) were added thereto. After continuing the reaction for 2 hours and a half, 220 parts of solution of urethane pre-polymer were added thereto and the reaction was completed after 30 minutes. Thus the product having the viscosity of 25 poise at 30° C. could be obtained.

This product was formed to film (a), and the coefficient of restitution was measured in the same manner as in case of the Example 1. The coefficients of restitution for the film formed from polymethyl glutamic acid resin (b) synthesized in the above A, and for the film formed from the blend (c) of polymethyl glutamic acid resin synthesized in the aforesaid (A) and urethane prepolymer synthesized in the foregoing (C), the Experimental Example 1 (monomer amount of polymethyl glutamic acid resin/urethane pre-polymer=35/45) were shown for comparison.

| Specimen | Coefficient of restitution at the time of restitution (percent) after— ||
| --- | --- | --- |
|  | 20 percent elongation | 50 percent elongation |
| (a) | 98.5 | 90.2 |
| (b) | 38.5 | 16.2 |
| (c) | 39.5 | 19 |

The resin (a) obtained in accordance with the present invention shows that the coefficient of restitution is extremely good.

Example 4.—By use of the same device as in case of the Example 1, 230 parts of ethylene dichloride were put in a reaction flask and were heated to 70° C. And after 0.336 part of ethylene diamine was added thereto, 70 parts of 10 percent solution prepared by dissolving 14 parts of urethane pre-polymer synthesized in the foregoing (C), the Experimental Example 2 in ethylene dichloride were added thereto. After 15 minutes, the temperature of the contents was raised to 30° C., and 20 percent solution prepared by dissolving 26 g. of γ-methyl-L-glutamate-N-carboxy anhydride-γ-methylester-N-carboxylic acid in a mixed solvent of ethylene dichloride and dimethylformamide (ethylene dichloride/dimethylformamide=72/26) were added. After completion of the reaction, the contents were heated to 80° C., and 70 parts of 10 percent solution of urethane pre-polymer were added in the same manner as in case of the Example 1. And then the reaction product obtained was of somewhat milky white and the final viscosity thereof was 7 poise at 30° C.

The coefficient of restitution was measured in the same manner as in case of Example 1, result of which was shown hereunder. (a) Shows a result for the resin synthesized in accordance with the present process, (b) for polymethyl glutamic acid resin synthesized in the above-mentioned (A), and (c) for product prepared by blending solution of polymethyl glutamic acid synthesized in the foregoing (A) (an amount corresponding to 26 g. of γ-methyl-L-glutamate-N-carboxy anhydride-γ-methyl-ester-N-carboxylic acid at the time of polymer solution) and 14 parts of urethane pre-polymer synthesized in the abovementioned (C), the Experimental Example 2.

| Specimen | Coefficient of restitution at the time of restitution (percent) after— ||
| --- | --- | --- |
|  | 20 percent elongation | 50 percent elongation |
| (a) | 98.8 | 86.5 |
| (b) | 38.5 | 16.2 |
| (c) | 35.2 | 16.1 |

Example 5.—By use of the same device as in case of the Example 1, 200 parts of chloroform were heated to 70° C., and after 0.306 part of ethylene diamine was added thereto, 55 parts of 10 percent solution prepared by dissolving 10.5 parts of urethane pre-polymer synthesized in the above-mentioned (C), the Experimental Example 3 in chloroform were added thereto. After 15 minutes, the temperature of the contents was raised to 30° C., and 20 percent solution prepared by dissolving 10 parts of β-methyl-DL-aspartate-N-carboxy anhydride in a mixed solvent of chloroform and dimethylformamide (chloroform/dimethylformamide=1/3) were added thereto, and after completion of the reaction, the temperature of the contents was raised to 80° C. Then 50 parts of urethane pre-polymer solution were added thereto to react and the product having the final viscosity of 20 poise (30° C.) was obtained.

The comparison for the coefficient of restitution obtained by the same manner as in case of the Example 1 is shown hereunder.

| Specimen | Coefficient of restitution at the time of restitution (percent) after— | |
|---|---|---|
| | 20 percent elongation | 50 percent elongation |
| (a) Resin synthesized in the Example 5 | 95.3 | 88.2 |
| (b) Resin synthesized in the experimental Example B | 28.2 | 12.5 |
| (c) Blend (DL-aspartic acid-B-methylester-NCA/urethane prepolymer in the experimental Example 3) | 28 | 11.5 |

Example 6.—By use of the same device as in case of the Example 1, 115.5 parts of a mixed solvent of ethylene dichloride and dimethylformamide (ethylene dichloride/dimethylformamide=10/1) were put in a reaction flask and the temperature of the contents was raised to 50° C. After 0.2 part of ethylene diamine was added thereto, 75.5 parts (urethane pre-polymer: 5 parts) of 7 percent solution prepared by dissolving 10 parts of urethane pre-polymer synthesized in the foregoing Experimental Example 1 in ethylene dichloride were added thereto. After 20 minutes from the addition, keeping the reaction temperature at 50° C., solution prepared by dissolving 18 parts of γ-methyl-L-glutamate-N-carboxy anhydride-γ-methylester-N-carboxylic acid in 80 parts of a mixed solvent of ethylene dichloride and dimethylformamide (ethylene dichloride/dimethylformamide=3/1) were added. After continuation of the reaction for about 50 minutes, the viscosity became to 2.3 poises (at 50° C.) and the increase of viscosity stopped. When 75.5 parts of remaining 7 percent solution of urethane pre-polymer (urethane pre-polymer: 5 parts) were gradually added thereto, the product having the final viscosity of 5 poises (50° C.) could be obtained. This product was formed to film and the coefficient of restitution was measured in the same manner as in case of the Example 1.

Coefficient of restitution, percent
Restitution after 20% elongation _____ 92.3
Restitution after 50% elongation _____ 80.2

Further, in case where the resin synthesized in this Example 6 was used as a surface finishing material and an under-treating material for an artificial leather, the same result as in case of Example 1 could be obtained.

Example 7.—By use of the same device as in case of the Example 1, 140 parts of dioxane were put in a reaction flask and the contents were heated to 80° C. And after 0.2 part of ethylene diamine was added thereto, 50 parts (urethane pre-polymer: 5 g.) of 10 percent solution prepared by dissolving 10 parts of urethane pre-polymer synthesized in the Experimental Example 1 in dioxane were added thereto. After 20 minutes, the reaction temperature was regulated to 30° C. and 120 parts of 10 percent solution prepared by dissolving 12 parts of γ-methyl-L-glutamate-N-carboxy anhydride-γ-methylester-N-carboxylic acid in dioxane were added. The viscosity increased and after 90 minutes, the viscosity reached to 2.5 poise and the increase of the same stopped.

The temperature of the reaction product was again raised to 80° C. and 50 parts (urethane pre-polymer: 5 g.) of remaining 10 percent solution of urethane pre-polymer were added thereto, then the viscosity of the reaction product became to 83 poise (80° C.). This product was formed to film and the coefficient of restitution was measured in the same manner as in case of the Experimental Example 1.

Coefficient of restitution, percent
Restitution after 20% elongation _____ 95.6
Restitution after 50% elongation _____ 84.0

Example 8.—By use of the same device as in case of the Example 1, 115.5 parts of a mixed solvent of ethylene dichloride and dimethylformamide (ethylene dichloride/dimethylformamide=10/1) were put in a reaction flask and the contents were heated to 50° C. And after 0.487 part of hexamethylene diamine were added thereto, 75.5 parts (urethane pre-polymer: 5.25 parts) of 7 percent solution prepared by dissolving 10.5 parts of urethane pre-polymer synthesized in the above-mentioned Experimental Example 1 in ethylene dichloride were added thereto. After 20 minutes from the addition, keeping the reaction temperature at 50° C., solution prepared by dissolving 18 parts of γ-methyl-L-glutamate-N-carboxy anhydride-γ-methylester-N-carboxylic acid in 80 parts of a mixed solvent of ethylene dichloride and dimethylformamide (ethyle dichloride/dimethylformamide=3/1) were added thereto. And the reaction was continued for about 50 minutes. Then the viscosity became to 22 poises (50° C.) and the increase of viscosity stopped. When 75.5 parts (urethane pre-polymer: 5.25 parts) of the remaining 7 percent solution of urethane pre-polymer were gradually added thereto, the product having the final viscosity of 5 poises (50° C.) could be obtained. This product was formed to film and the coefficient of restitution was measured in the same manner as in the case of the Example 1.

Coefficient of restitution, percent
Restitution after 20% elongation _____ 95
Restitution after 50% elongation _____ 83.2

Example 9.—In a flask with four mouths which was equipped with a cooling tube having stirrer, thermometer and tube filled with calcium chloride, 230 parts of ethylene dichloride were put and were heated to 70° C. After adding 0.336 part of ethylene diamine thereto, 70 parts of 10 percent solution prepared by dissolving 14 parts of urethane pre-polymer synthesized in the aforesaid Experimental Example 2 in ethylene dichloride were added thereto. After 15 minutes, the temperature of the contents was regulated to 30° C., and 20 percent solution prepared by dissolving 26 g. of γ-methyl-L-glutamate-N-carboxy anhydride in a mixed solvent of ethylene dichloride and dimethylformamide (ethylene dichloride/dimethylformamide=72/26) was added thereto. After completion of the reaction, the contents were heated to 80° C., and 70 parts of 10 percent solution of urethane pre-polymer were added thereto in the same manner as in case of the Example 1. Then the reaction product became somewhat milky white and the final viscosity thereof was 7 poise at 30° C.

The polymer solution obtained was coated on nonwoven cloth or woven cloth impregnated with a polyurethane, which resulted the product having almost the same feeling in touch as the one obtained from an individuality of polymethyl glutamic acid resin obtained in the Experimental Example A, resemblance to a natural leather in the points of an appearance and a feeling in touch, and improvements in regard to elasticity, adhesive property and colouring property with pigments.

As a result of testing the surface coated product in the point of wrinkle-proof property by means of Scott tester (load: 2 kg.), any of changes in an appearance could not be found in the one obtained in accordance with the present example against wrinkles of 7000 times or more, while in the one coated with polymethyl glutamic acid resin, surface layer was disquamated by wrinkles of 500 to 600 times due to weak adhesive power and cracks were made due to a short of elasticity of film.

Further, the cold-proof property was extremely good and the solvent-proof property was equal being compared with those of the existing ones.

EXAMPLE 10

By use of the same reaction device as in case of the Example 1, 200 parts of chloroform were heated to 70° C., and 0.306 part of ethylene diamine were added thereto. After that, 55 parts of 10 percent solution prepared by dissolving 10.5 parts of urethane pre-polymer synthesized in the above-mentioned (C), the Experimental Example 3 in chloroform was added thereto. And after 15 minutes, the temperature of the contents was regulated to 30° C., 20 percent solution prepared by dissolving 10 parts of β-methyl-L-aspartate-N-carboxy anhydride in a mixed solvent of chloroform and dimethylformamide (chloroform/dimethylformamide=1/3) was added thereto. And after completion of the reaction, the contents were regulated to 80° C., and 50 parts of urethane pre-polymer were added thereto to react therewith. And the product having the final viscosity of 20 poises (30° C.) could be obtained.

The product obtained was coated as a surface finishing material on non-woven cloth or woven cloth impregnated with polyurethane resin. The resulting product showed improvements in the points of adhesive property and elasticity being compared with those of the individuality of polymethyl aspartic acid, and in the wrinkle-proof test, the same result as in case of the Example 9 could be obtained.

Example 11.—By use of the same reaction device as in case of the Example 1, 115.5 parts of a mixed solvent of ethylene dichloride and dimethylformamide (ethylene dichloride/dimethylformamide=10/1) were put in a reaction flask, and the contents were heated to 50° C. After adding 0.2 part of ethylene diamine thereto, 75.5 parts (urethane prepolymer: 5 parts) of 7 percent solution prepared by dissolving 10 parts of urethane pre-polymer synthesized in the above-mentioned Experimental Example 1 in ethylene dichloride were added thereto. After 20 minutes from the addition, keeping the reaction temperature at 50° C., solution prepared by dissolving 18 parts of γ-methyl-L-glutamate-N-carboxy anhydride in a mixed solvent of ethylene dichloride and dimethylformamide (ethylene dichloride/dimethylformamide=3/1) was added thereto. After continuing the reaction for about 50 minutes, the viscosity became to 2.3 poises (at 50° C.) and the increase of viscosity stopped. 75.5 parts (urethane pre-polymer: 5 parts) of remaining 7 percent solution of urethane pre-polymer were gradually added thereto, and then the product having the final viscosity of 5 poise (50° C.) could be obtained.

The product obtained was coated as a surface finishing material on non-woven cloth or woven cloth impregnated with polyurethane resin, which led to the same result as in case of the Example 9.

Example 12.—By use of the same reaction device as in case of the Example 1, 320 parts of a mixed solvent of ethylene dichloride and dimethylformamide (ethylene dichloride/dimethylformamide=10/1) were put in a reaction flask, and the contents were heated to 30° C. 0.7 part of ethylene diamine were added thereto and 207 parts (urethane prepolymer: 14.5 parts) of 7 percent solution prepared by dissolving 24 parts of urethane pre-polymer synthesized in the above-mentioned Experimental Example 4 in ethylene dichloride were added thereto. After the addition, the temperature of the contents was heated to 50° C. and was kept for 30 minutes. And then a solution prepared by dissolving 54 parts of γ-methyl-L-glutamate-N-carboxy in 200 parts of a mixed solvent of ethylene dichloride and dimethylformamide (ethylene dichloride/ dimethylformamide=3/1) were added thereto. When the reaction was continued for about 90 minutes, the viscosity became to 15 poises and the increase of viscosity stopped. Then 143 parts of remaining 7 percent solution of urethane pre-polymer were added thereto and after about 30 minutes, the product having the final viscosity of 45 poises (50° C.) could be obtained.

This product was formed to film and the coefficient of restitution thereof was measured in the same manner as in case of the Example 1.

Coefficient of restitution, percent
Restitution after 20% elongation _____ 80.5
Restitution after 50% elongation _____ 69

Further, said film showed a very good weathering resistance and did not change to yellow.

In case where the resin synthesized in the Example 12 was used as a surface finishing material and an undertreating material for an artificial leather, the same result as in case of the Example 1 could be obtained.

Further, the present invention relates to the process for producing the synthetic resin (C) and the process for producing the artificial leather by use of said synthetic resin (C), wherein the synthetic resin (C) comprises that a compound having amino groups at terminals thereof (A) is obtained by reactcing an amine with an α-amino acid N-carboxy anhydride, and the synthetic resin (C) is obtained by reacting the compound having the amino groups at terminals thereof (A) with an urethane pre-polymer having isocyanate groups at terminals thereof.

The reaction in this case is deemed to be proceeded as follows:

(I) Reaction between the amine and the N-carboxy-α-amino acid anhydride:

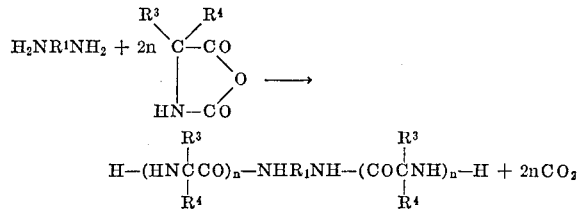

(II) Reaction between the reaction product obtained in (I) and urethane pre-polymer:

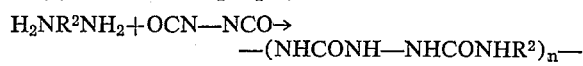

(wherein $H_2NR^2NH_2$ is a reaction product by I).

In the reaction (II), crosslinking reaction;

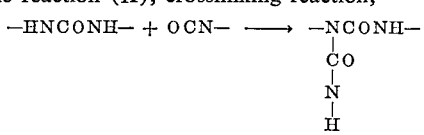

is accompanied.

Examples will be explained hereinafter.

Example 13.—By use of the same reaction device as in case of the Example 1, 120 parts of a mixed solvent of ethylene dichloride and dimethylformamide (ethylene dichloride/dimethylformamide=12/1) were put in a reaction flask and the contents were heated to 50° C. After adding 0.2 parts of ethylene diamine thereto, solution prepared by dissolving 15 parts of γ-methyl-L-glutamate-N-carboxy anhydride in 110 parts of a mixed solvent of ethylene dichloride and dimethylformamide (ethylene dichloride/dimethylformamide=4/1) was added thereto, then the viscosity increased and the increase of the viscosity stopped after about 120 minutes. The reaction product was heated to 70° C. and solution prepared by dissolving 0.5 part of urethane pre-polymer synthesized in the Experimental Example 1 in 150 parts of ethylene dichloride was added thereto, then the viscosity of the reaction product became to 24 poises (50° C.).

(1) This product (a) was formed to film. A blend (b) was so prepared as that polymethyl glutamic acid (an amount of monomer at a time of synthesis: 15 parts) synthesized in the Experimental Example A was mixed to urethane pre-polymer (10 parts) synthesized in the Experimental Example 1. The test results about the both (a) and (b) are shown hereunder.

| Specimen | Coefficient of restitution at the time of restitution (percent) after— | |
|---|---|---|
| | 20 percent elongation | 50 percent elongation |
| (a) | 82.2 | 75.2 |
| (b) | 36 | 18 |

(2) In case where the product obtained was coated as a surface finishing material on non-woven cloth or woven cloth impregnated with a polyurethane resin, the same result as in case of the Example 1 could be obtained.

Example 14.—By use of the same device as in the case of Example 1, 150 parts of a mixed solvent of ethylene dichloride and dimethylformamide (ethylene dichloride/dimethylformamide=10/1) were put in a reaction flask and the contents were heated to 50° C. After adding 0.4 part of ethylene diamine thereto, solution prepared by dissolving 15 parts of γ-methyl-L-glutamate-N-carboxy anhydride in 110 parts of a mixed solvent of ethylene dichloride and dimethylformamide (ethylene dichloride/dimethylformamide=4/1) was added thereto. After the addition, the reaction was continued for 90 minutes, and then solution prepared by dissolving 20 parts of urethane pre-polymer synthesized in the Experimental Example 1 in 200 parts of ethylene dichloride was added thereto. A viscosity of the reaction product was 15 poise (50° C.). This product was formed to film and the coefficient of elastic restitution thereof was measured, a result of which was shown hereinafter. (A) represents the result for the resin synthesized in accordance with the present invention, (b) for the polymethyl glutamic acid resin synthesized in the above-mentioned (A), and (c) for a blend prepared by mixing the solution of polymethyl glutamic acid synthesized in the above-mentioned A (an amount corresponding to 15 parts of γ-methyl-L-glutamate-N-carboxy anhydride at the time of synthesis) and urethane pre-polymer (20 parts) synthesized in the Experimental Example 2.

| Specimen | Coefficient of restitution at the time of restitution (percent) after— | |
|---|---|---|
| | 20 percent elongation | 50 percent elongation |
| (a) | 100 | 95 |
| (b) | 38.5 | 16.2 |
| (c) | 45.2 | 28.6 |

We claim:
1. A process for producing a synthetic resin (C) which comprises:

(I) reacting an amine having at least two active hydrogen atoms with a urethane pre-polymer having isocyanate groups at the terminals thereof in an equivalent less than an equivalent of the amine to produce a compound (A) having amino groups at the terminals thereof;

(II) reacting compound (A) with an α-amine-acid N-carboxy anhydride to produce compound (B), a compound having amino groups at the terminals thereof; and (III) reacting compound (B) with additional urethane prepolymer, said urethane prepolymer having isocyanate groups at the terminals thereof, to produce synthetic resin (C).

2. A process for producing a synthetic resin (C′) which comprises:

(I) reacting an amine having at least two active hydrogen atoms with a α-amino acid N-carboxy anhydride to produce a compound (A′) having amino groups at the terminals thereof; and (II) reacting compound (A′) with a urethane pre-polymer, said urethane pre-polymer having isocyanate groups at the terminals thereof, to produce synthetic resin (C′).

3. The process of claim 1, wherein the urethane pre-polymer is the reaction product of polyethylene glycol with diphenylmethane disocyanate, toluene-2,4, diisocyanate or meta-xylene diisocyanate or polytetramethylene glycol with diphenylmethane diisocyanate.

4. The process of claim 3, wherein the amine is selected from the group consisting of ethylene diamine and hexamethylene diamine.

5. The process of claim 4, wherein the α-amino acid N-carboxy anhydride is selected from the group consisting of γ-methyl-L-glutamate-N-anhydride and β-methyl-DL-aspartate-N-carboxy anhydride.

6. The process of claim 2, wherein the urethane pre-polymer is the reaction product of polyethylene glycol with diphenylmethane diisocyanate, toluene-2,4-diisocyanate or meta-xylene diisocyanate or polytetramethylene glycol with diphenylmethane diisocyanate.

7. The process of claim 2, wherein the amine is selected from the group consisting of ethylene diamine and hexamethylene diamine.

8. The process of claim 2, wherein the α-amino acid N-carboxy anhydride is selected from the group consisting of γ-methyl-L-glutamate-N-anhydride and β-methyl-DL-aspartate-N-carboxy anhydride.

9. The product produced by the process of claim 1.

10. The product produced by the process of claim 2.

References Cited

UNITED STATES PATENTS 2,946,771    1/1960    Ballard _____ 260—77.5

DONALD E. CZAJA, Primary Examiner

M. J. WELSH, Assistant Examiner

U.S. Cl. X.R.

117—139.5; 260—75, 112, 858